United States Patent
Most et al.

(10) Patent No.: US 9,115,963 B2
(45) Date of Patent: Aug. 25, 2015

(54) CANISTERS WITH INTEGRAL LOCKING MEANS AND CAST BOOSTER EXPLOSIVES COMPRISING THE SAME

(75) Inventors: Michael Ray Most, Logan, OH (US); Leonardo Gabriel Rivera, West Hartford, CT (US); Lawrence J. Shank, III, East Hartland, CT (US)

(73) Assignee: DYNO NOBEL INC., Salt Lake City, UT (US)

( * ) Notice: Subject to any disclaimer, the term of this patent is extended or adjusted under 35 U.S.C. 154(b) by 58 days.

(21) Appl. No.: 14/116,513
(22) PCT Filed: May 9, 2012
(86) PCT No.: PCT/US2012/037061
§ 371 (c)(1),
(2), (4) Date: Feb. 26, 2014
(87) PCT Pub. No.: WO2012/154811
PCT Pub. Date: Nov. 15, 2012

(65) Prior Publication Data
US 2014/0345486 A1    Nov. 27, 2014

Related U.S. Application Data

(60) Provisional application No. 61/484,365, filed on May 10, 2011.

(51) Int. Cl.
*F42B 3/08* (2006.01)
*F42B 3/26* (2006.01)
(Continued)

(52) U.S. Cl.
CPC . *F42B 3/26* (2013.01); *B29C 45/14* (2013.01); *F42B 3/28* (2013.01); *F42D 1/04* (2013.01);
(Continued)

(58) Field of Classification Search
CPC .............. F42B 3/08; F42B 3/26; F42D 1/043; F42D 1/04; B29C 45/14; B29K 2023/0633
USPC ......... 102/331, 304, 322, 275.4, 275.12, 318, 102/332
See application file for complete search history.

(56) References Cited

U.S. PATENT DOCUMENTS 3,092,025 A    6/1963  Hradel et al.
3,183,836 A    5/1965  Griffith
(Continued)

FOREIGN PATENT DOCUMENTS

WO    9725585 A2    7/1997

OTHER PUBLICATIONS

International Search Report for corresponding international application PCT/US2012/037061, international filed of May 9, 2012, mailed Sep. 7, 2012, 5 pages.
(Continued)

*Primary Examiner* — Samir Abdosh
*Assistant Examiner* — John D Cooper
(74) *Attorney, Agent, or Firm* — Cantor Colburn LLP

(57) ABSTRACT

A booster explosive (10) is comprised of assembled components comprising a canister body (12, 112) having a fuse tunnel (22) formed integrally therewith and a separate cap well (14, 114) mounted within the canister body (12, 112) which is filled with a solid cast explosive (34). The connector end (14c, 114c, 214c) of cap well (14, 114) is configured to engage cap well mounting fixture (28, 128) disposed within the canister body (12, 112). Cap well mounting fixture (28, 128) has a flexible and resilient crown-shaped locking member (28a, 128a) formed integrally therewith and is otherwise configured to positively retain a detonator (16, 116) within the cap well (14, 114). More than one cap well (214a, 214b, 214a', 214b') and more than one fuse tunnel (222a, 222b, 222a', 222b') may be provided in the canister body (212, 212').

19 Claims, 8 Drawing Sheets

(51) Int. Cl.
  *F42D 1/04* (2006.01)
  *B29C 45/14* (2006.01)
  *F42B 3/28* (2006.01)
  *B29K 23/00* (2006.01)
  *B29L 31/00* (2006.01)

(52) U.S. Cl.
  CPC ......... *F42D 1/043* (2013.01); *B29K 2023/0633* (2013.01); *B29L 2031/712* (2013.01); *F42B 3/08* (2013.01)

(56) References Cited

U.S. PATENT DOCUMENTS

| | | |
|---|---|---|
| 3,407,730 A | 10/1968 | Griffith |
| 3,437,037 A | 4/1969 | Newman |
| 3,437,038 A | 4/1969 | Newman |
| 3,451,341 A | 6/1969 | Dittmann |
| 3,507,218 A | 4/1970 | Walker et al. |
| 3,604,353 A * | 9/1971 | Newman ............ 102/332 |
| 3,831,522 A | 8/1974 | Romney |
| 3,955,504 A | 5/1976 | Romney |
| 4,023,494 A | 5/1977 | Barton et al. |
| 4,178,852 A | 12/1979 | Smith et al. |
| 4,295,424 A | 10/1981 | Smith et al. |
| 4,334,476 A | 6/1982 | Day et al. |
| 4,383,484 A | 5/1983 | Morrey |
| 4,425,849 A | 1/1984 | Jorgenson |
| 4,485,741 A | 12/1984 | Moore et al. |
| 4,637,312 A * | 1/1987 | Adams et al. ............ 102/275.12 |
| 4,765,246 A * | 8/1988 | Carlsson et al. ............ 102/318 |
| 4,799,428 A * | 1/1989 | Yunan ............ 102/322 |
| 5,763,816 A * | 6/1998 | Keeling ............ 102/322 |
| 6,112,666 A | 9/2000 | Murray et al. |
| 7,472,652 B1 | 1/2009 | Scheid |
| 7,823,508 B2 | 11/2010 | Anderson et al. |
| 7,882,784 B2 | 2/2011 | Scheid |
| 7,882,785 B2 | 2/2011 | Scheid |
| 7,992,495 B2 | 8/2011 | Rowe et al. |
| 8,127,682 B1 * | 3/2012 | Sonday et al. ............ 102/275.4 |
| 2011/0036259 A1 | 2/2011 | Bengtsson |
| 2012/0192748 A1 | 8/2012 | Scheid et al. |

OTHER PUBLICATIONS

Written Opinion for corresponding international application PCT/US2012/037061, international filed of May 9, 2012, mailed Sep. 7, 2012, 6 pages.

* cited by examiner

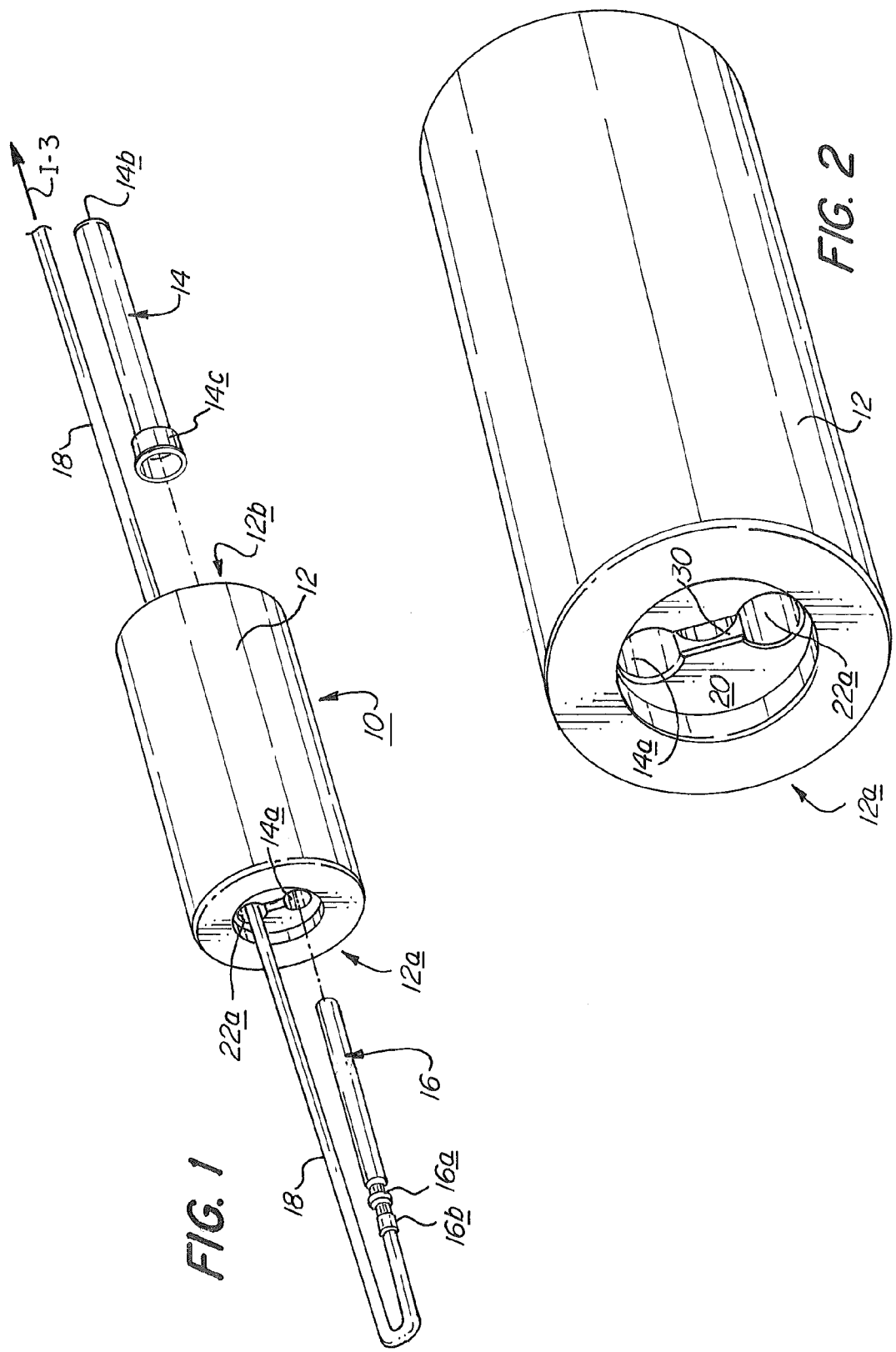

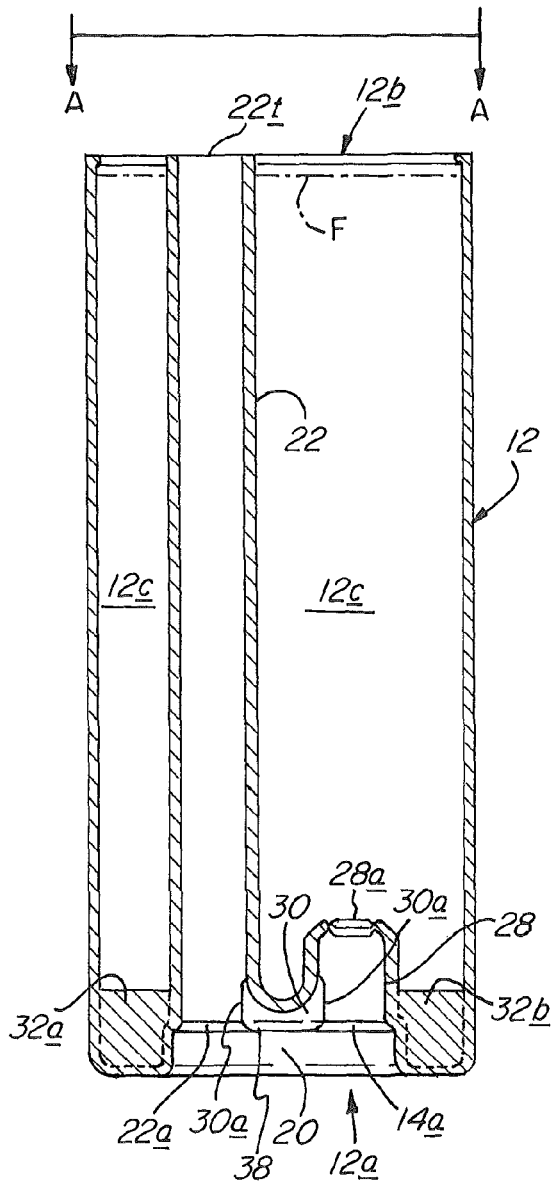
FIG. 3
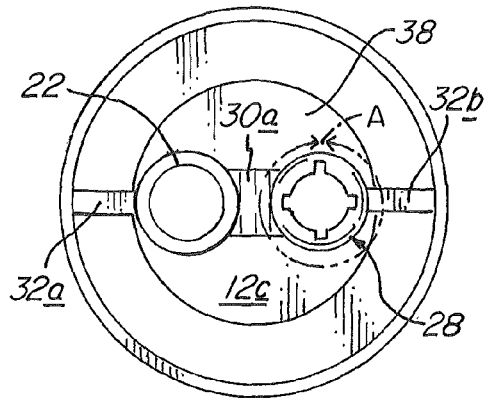
FIG. 3A
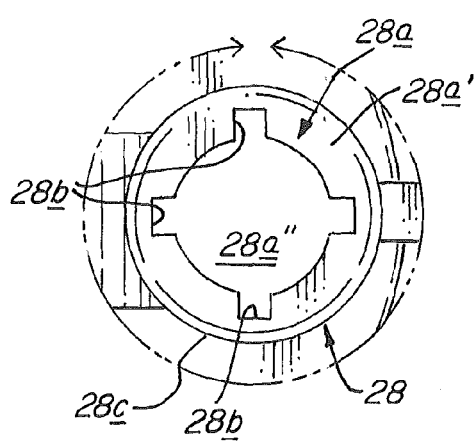
FIG. 3A-A

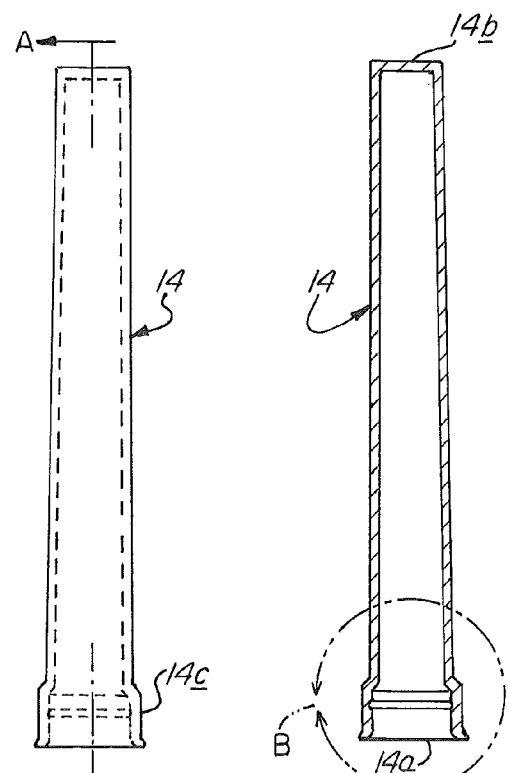
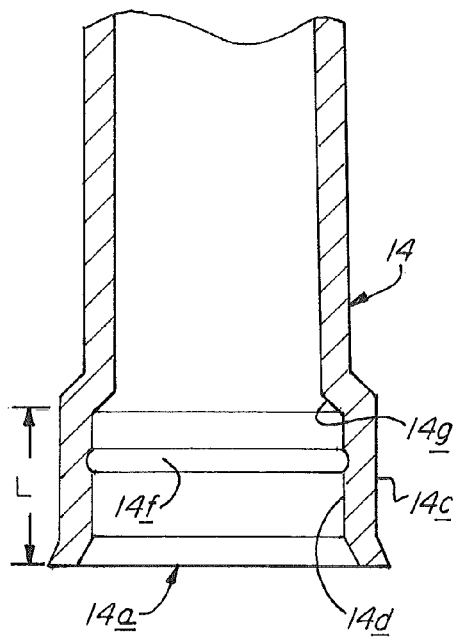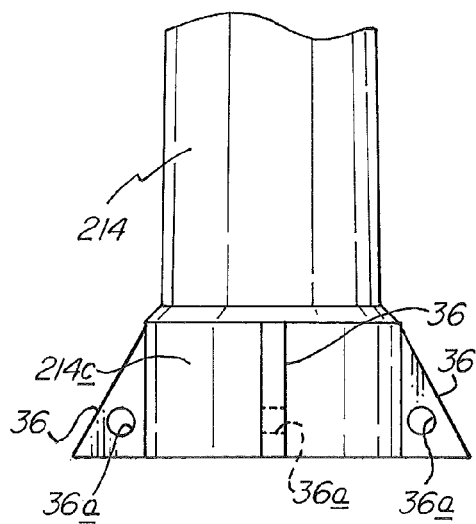

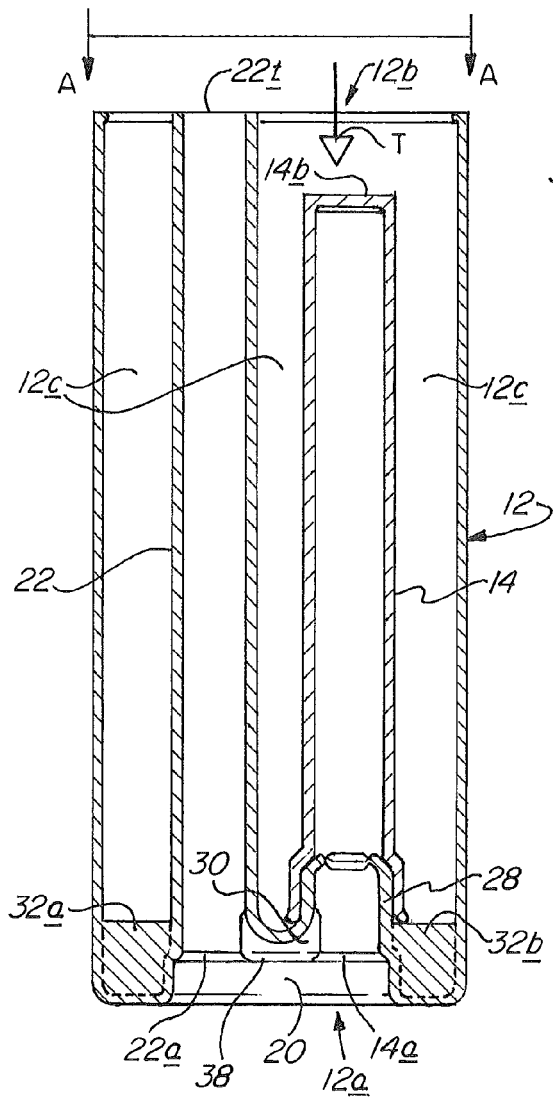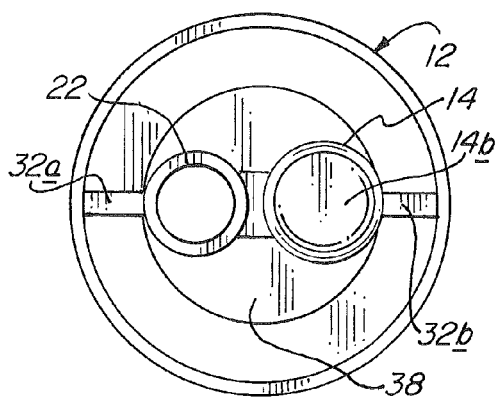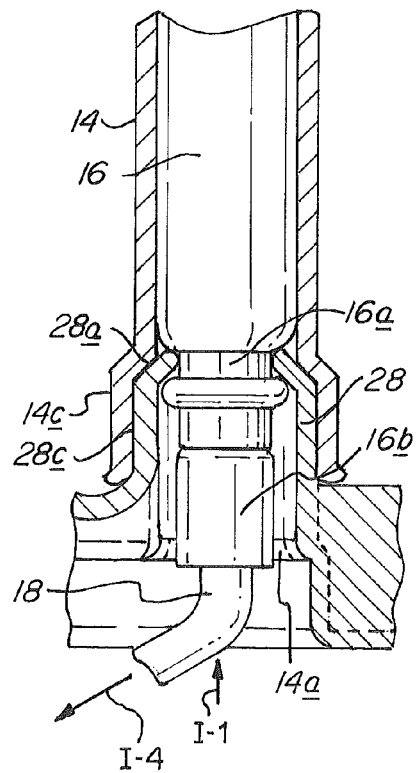
FIG. 5
FIG. 5A
FIG. 5B

CANISTERS WITH INTEGRAL LOCKING MEANS AND CAST BOOSTER EXPLOSIVES COMPRISING THE SAME

CROSS-REFERENCE TO RELATED APPLICATION

This application is a U.S. national stage application of International Application No. PCT/US2012/037061 entitled "Canisters With Integral Locking Means and Cast Booster Explosives Comprising the Same ", which has an international filling date of 9 May 2012, and which claims priority of provisional patent application Ser. No. 61/484,365 filed on May 10, 2011 in the name of Michael R. Most and entitled "Explosives Canister With Integral Locking Means".

BACKGROUND OF THE INVENTION

1. Field of the Invention

The present invention concerns a novel canister assembly for a cast booster explosive, and cast booster explosives comprising the canister assembly. The cast booster explosives are of the type utilized to detonate normally cap-insensitive explosives such as ammonium nitrate and fuel oil ("ANFO") explosives. The present invention also concerns an efficient method of making the canister assembly by separate injection molding of the canister and its cap well, and for making a cast booster explosive.

2. Related Art

Cast booster explosives are normally cast with a fuse tunnel and a cap well, the tunnel providing a passageway for a fuse connected to a detonator, sometimes referred to as a detonator cap or simply cap, which is received within the cap well. This construction is usually attained by pouring a flowable explosive into a booster shell, i.e., a canister, having placed within it a removable molding fixture which forms within the cast explosive a fuse tunnel open at both ends and one or more cap wells open to the exterior of the canister at one end and closed at its other end. The flowable explosive is caused or allowed to harden or set within the canister to provide the cast booster explosive, and the molding fixture is removed. It is known to insert into the open end of the cap wells, prior to complete hardening of the explosive, a disc-like locking member to retain a detonator within the cap well.

The prior art also shows canisters for cast booster explosives having fuse tunnels and cap wells as part of a canister body into which a flowable explosive is placed to cure or harden. For example, U.S. Pat. No. 4,334,476 issued Jun. 15, 1982 to John T. Day et al. for "Primer Cup" discloses a canister or cup having a central fuse conduit 18' (FIG. 1) open at each end and a conduit 26 closed at its top end 28 which serves as a cap well. The cup 10 may be made of polyethylene (col. 5, lines 30-31) or other resins by an injection molding process (col. 8, lines 57-68). In addition see U.S. Pat. No. 3,183,836 issued May 18, 1965 to G. L. Griffith for "Canister For Cast Primer", which discloses a two-part plastic (col. 1, lines 13-25) container 11 and cover 12. See FIG. 5 and col. 2, lines 21-27. Integral ribbed wells 20 and 21 serve as, respectively, a fuse tunnel and cap well.

U.S. Pat. No. 3,955,504 issued May 11, 1976 to Russell H. Romney for "Explosive Booster Casing" shows two hemispherical halves having, when fitted together (FIG. 4), a cap or cord-receiving tube 14 and a cap or cord-receiving tube 27. See col. 3, lines 33-58.

U.S. Pat. No. 3,407,730 was issued on Oct. 29, 1968 to G. L. Griffith for "Retainer For Holding A Detonator In A Detonator Receptacle And Explosive Cartridge Container Containing The Same". FIGS. 1 and 2 thereof show a "digitated retainer" as an integral portion of an end cap made of a plastic material such as polypropylene which is molded in one piece with a central opening 2 into which six fingers 3 extend, as described at col. 4, lines 1-35.

U.S. Pat. No. 6,112,666, "Explosives Booster and Primer", issued on Sep. 5, 2000 to C. M. Murray et al. shows a booster explosive having an integral fastening means for retaining in place non-electric tubing (shock tube) serving as the fuse of the detonator retained within the booster.

In use, cast booster explosives are normally lowered into a borehole, which may be as deep as 10, 20 or 30 feet (3, 6.1 and 9.1 meters, respectively) or deeper. More than one booster may be loaded into a given borehole and in such case the two or more boosters are normally positioned at different depths within a given borehole. The booster explosive(s) are employed to initiate a bulk explosive such as an ANFO (ammonium nitratefuel oil) slurry or emulsion which is poured into the borehole.

In any case, lowering the booster explosive into the hole may be done by means of the fuse which extends from the detonator through the booster explosive and to the surface for connection to a trunk line. This can put considerable stress on the fuse, sometimes resulting in the cap being dislodged at least partially from the cap well, which presents the danger of a malfunction. Even when a separate downline, such as a low energy detonating cord is used to lower one or more booster explosives into a borehole, stress may be placed on the detonator fuse ends by handling and lower the booster explosives.

SUMMARY OF THE INVENTION

Generally, the present invention provides components for a canister assembly, a canister assembly, and a cast booster explosive comprising the canister assembly. The canister assembly comprises a canister body having thereon an integral fuse tunnel and an integral cap well mounting fixture on which a separate (from the canister body) cap well is mounted within the interior of the canister body. The canister body also has a locking member adjacent the mounting fixture to secure in place a detonator inserted into the cap well. The locking member is conveniently formed as an integral part of the mounting fixture and hence as an integral part of the canister body. A cast booster explosive is obtained in the known manner by flowing a flowable explosive into the canister assembly and allowing or causing the explosive to harden therein.

Specifically, in accordance with the present invention there is provided a pair of components for a canister assembly for a cast booster explosive, the components comprising a canister body and, separate from the canister body, a cap well. The canister body has (i) a wall defining an interior of the canister body, (ii) a canister base closing one end of the canister body, (iii) a fuse tunnel open at both ends thereof and extending along the length of the canister body, (iv) a cap well mounting fixture open to passage of a detonator therethrough, and (v) a locking member disposed at the mounting fixture and configured to retain a detonator within the cap well. The cap well is closed at one end and open at its opposite connector end and is configured to have its connector end seated on the cap well mounting fixture and to receive such detonator within the cap.

In one aspect of the present invention, the canister body has a canister base, the cap well connector end has an interior surface, the cap well mounting fixture comprises a cylindrical member which cooperates with the locking member to define an interior passageway which opens to a cap well access opening in the canister base, the mounting fixture has an exterior surface which is configured to be snugly engaged by the interior surface of the cap well base whereby to securely mount the cap well on the mounting fixture, and the locking member is carried on the mounting fixture and extends into the interior passageway.

Other aspects of the present invention comprise one or more of the following features alone or in any suitable combination: the mounting fixture and the locking member may comprise an integral, one-piece member with the locking member comprising an inwardly tapering crown which partially occludes the interior passageway; the interior surface of the cap well base and the exterior surface of the mounting fixture may each be of cross-sectional circular configuration; a canister assembly for a cast booster explosive comprising the any suitable combination of the above-described components, wherein the cap well is mounted on the mounting fixture; and a cast booster explosive may comprise the foregoing canister assembly having a cast explosive contained within the interior of the canister body.

In yet a further aspect of the present invention, there is provided a canister assembly for a cast booster explosive, the canister assembly comprising the following components. A cylindrical canister body has (i) a wall defining an interior of the canister body, (ii) an open top end, (iii) an opposite bottom end closed by a canister base, (iv) a fuse tunnel open at both ends thereof and extending within the interior of the canister body from a fuse access opening in the base, (v) a cap well mounting fixture open to a cap access opening in the base, and (vi) a locking member which optionally may be integrally formed with the cap well mounting fixture and which is configured to engage a detonator to retain it within the canister body, all the features of (i) through (vi) above being embodied in an injection-molded single plastic piece. The assembly further comprises a cap well separate from the canister body and optionally also an injection-molded plastic structure, the cap well being closed at one end and open at its opposite connector end and configured to receive therein a detonator, the connector end being configured to be seated on the cap well mounting fixture to mount the cap well within the interior of the canister body.

In another aspect of the present invention, the base of the canister body may have therein a recess defining a platform which extends into the interior of the canister body, and the cap access opening and the fuse access opening extend from the interior of the canister body through the platform to the recess.

Yet another aspect of the present invention provides that the platform has therein a groove connecting the cap access opening and the fuse access opening, the groove being configured to receive therein a detonator fuse extending between the cap access opening via the groove to the fuse access opening.

Still another aspect of the invention provides that the cap well is mounted on the cap well mounting fixture with the cap well disposed within the interior of the canister body.

A method aspect of the present invention provides for making a canister assembly for a cast booster explosive comprising the steps of : (a) molding, for example, injection molding, a synthetic polymeric material to form a one-piece cylindrical canister body having the following features (i) through (vi) inclusive: (i) a wall defining an interior of the canister body, (ii) an open top end, (iii) an opposite bottom end closed by a canister base, (iv) a fuse tunnel open at both ends thereof and extending within the interior of the canister body from a fuse access opening in the base, (v) a cap well mounting fixture open to a cap access opening in the base, and (vi) a locking member configured to engage a detonator to retain it within the canister body; (b) in a step separate from step (a), injection molding a cap well closed at one end and open at its opposite connector end, the connector end being configured to be seated on the mounting fixture of the canister body; and (c) after step (b), mounting the cap well within the interior of the canister body onto the cap well mounting fixture to form the canister assembly.

A further method aspect of the present invention comprises incorporating the canister assembly into a cast booster explosive by the additional steps of: introducing a flowable explosive into the interior of the canister body; and allowing or causing the flowable explosive to harden.

Still another method aspect of the present invention comprises introducing into the cap well via the cap access opening a detonator having a fuse extending therefrom to engage the detonator with the locking member, and threading the fuse via the fuse access opening through and out of the fuse tunnel and exteriorly of the cast booster explosive.

Other aspects of the present invention will be apparent from the following description and appended drawings.

BRIEF DESCRIPTION OF THE DRAWINGS

FIG. 1 is an exploded view of a cast booster explosive in accordance with one embodiment of the present invention, the cast explosive contained within the canister assembly not being visible in FIG. 1;

FIG. 2 is a perspective view of the closed, bottom end of the canister assembly of the cast booster explosive of FIG. 1, with the detonator and its fuse omitted for clarity of illustration;

FIG. 3 is a longitudinal cross-sectional elevation view of the canister body comprising part of the canister assembly of the booster explosive of FIG. 1;

FIG. 3A is a plan view taken along line A-A of FIG. 3;

FIG. 3A-A is a view, enlarged relative to FIG. 3A, of the portion of FIG. 3A enclosed within the circle A thereof;

FIG. 4 is an elevation view of the cap well of the cast booster explosive of FIG. 1;

FIG. 4A is a cross-sectional view taken along line A-A of FIG. 4;

FIG. 4B is a view, enlarged relative to FIG. 4A, of the portion of FIG. 4A enclosed within circle B thereof;

FIG. 4C is a view of the base or mounting end of another embodiment of a cap well in accordance with the present invention;

FIG. 5 is a view corresponding to that of FIG. 3 but showing the cap well mounted in place within the canister body to comprise the canister assembly;

FIG. 5A is a plan view taken along line A-A of FIG. 5;

FIG. 5B is a partial elevation view, enlarged relative to FIG. 5, of the mounting fixture of FIG. 5, but showing a detonator engaged with the mounting fixture;

DETAILED DESCRIPTION OF THE INVENTION AND SPECIFIC EMBODIMENTS THEREOF

Figure 5C:
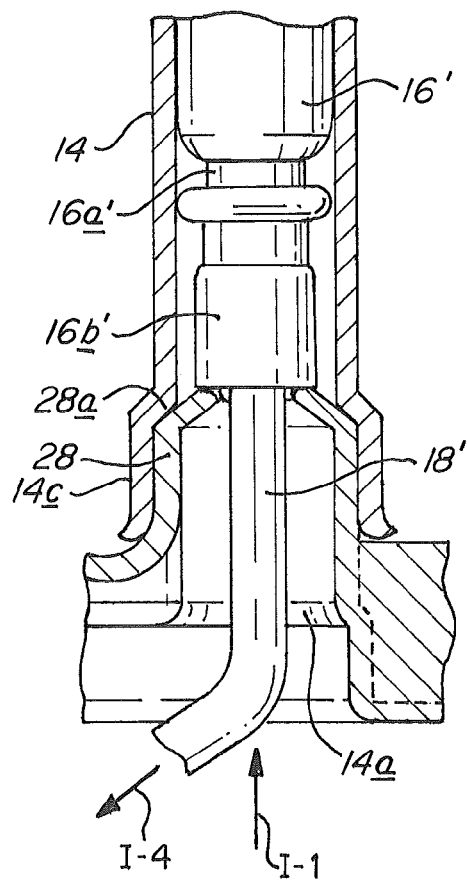
FIG. 5C is a view corresponding to that of FIG. 5B but showing a detonator which is shorter than that shown in FIG. 5B.

A cast booster explosive and two components thereof are shown in FIGS. 1 through 6 inclusive. FIG. 1 is an exploded view showing a booster explosive 10 comprised of a cylindrical canister body 12 and a separate cap well 14. As used herein and in the claims, the term "cylindrical" is used in its broadest sense and does not require a circular cross section of the canister body. The cross section of the cylindrical canister body may be circular, as illustrated in the drawings, or it may be square, rectangular, oval, polygonal or any suitable shape. Cap well 14 is a separate piece from canister body 12 and is configured to be mounted within canister body 12. Canister body 12 has a bottom end 12a, an open, top end 12b and an interior 12c (FIG. 3). Canister body 12 and cap well 14 may be made of any suitable material and formed by any suitable conventional molding techniques including injection molding. Generally, a low density polyethylene is suitable for the canister body 12 and for cap well 14, although other suitable moldable resins may of course be used. A cast explosive contained within canister body 12 is not visible in FIG. 1.

A conventional detonator 16 is shown in FIG. 1 with its fuse 18, which typically may comprise a low-energy detonating cord, or a shock tube or wire electrical connectors. A crimp 16a (FIG. 1) is formed in the metal shell (unnumbered) of detonator 16 to hold in place a bushing 16b which seals the end of detonator 16 through which fuse 18 extends. Fuse 18 is shown in FIG. 1 as threaded through a fuse tunnel 22 (FIGS. 3 and 3A). Detonator 16 is shown in FIG. 1 as being aligned with a cap access opening 14a (FIGS. 1 and 2) in the base or bottom end 12a of canister body 12 for insertion of detonator 16 into cap well 14 when the latter is mounted in place within canister body 12.

Referring to FIGS. 1, 2, 3 and 3A, canister body 12 has a recess 20 (FIG. 2) formed in the base at bottom end 12a thereof which results in a raised platform 38 (FIG. 3A) protruding slightly into the interior 12c. There are formed in the recess 20 a cap access opening 14a leading to cap well 14, and a fuse access opening 22a leading to (FIGS. 3 and 3A) fuse tunnel 22. Fuse tunnel 22 has a top end 22t which terminates at or near top end 12b of canister 12. A recessed groove 30 (FIGS. 2 and 3) extends between access openings 14a and 22a and is defined by groove walls 30a (FIG. 3A) which extend into the interior 12c (FIGS. 3 and 3A) of canister body 12. Radial reinforcing ribs 32a, 32b (best seen in FIG. 3A) serve to reinforce the structure.

FIG. 3 shows a fuse tunnel 22 disposed substantially parallel to the longitudinal axis of canister body 12, as is conventional in the art. FIG. 3 further shows the open, top end 12b of canister body 12 and that fuse tunnel 22 is a tube open at both its ends and has an inside diameter large enough to permit threading of at least fuse 18 and a downline (not shown) through fuse tunnel 22. Unlike the cap well described in detail below in connection with FIGS. 4-4B, fuse tunnel 22 is preferably integrally molded as part of canister body 12 in order to reduce the number of separate parts and the time required for assembly.

A cap well mounting fixture 28 (FIGS. 3, 3A and 3A-A) is formed at the base of the interior 12c of canister body 12. FIGS. 3 and 3A omit the cap well which will be mounted on cap well mounting fixture 28. FIGS. 5 and 5A, which correspond to FIGS. 3 and 3A, show the cap well 14 mounted on cap well mounting fixture 28 to dispose cap well 14 within the interior 12c of canister body 12. Therefore it is not necessary to repeat a description of the numbered elements in FIGS. 5 and 5A as they have already been described with respect to FIGS. 3 and 3A. Cap well 14 (FIG. 5) is simply passed through open, top end 12b of canister body 12 in the direction shown by arrow T in FIG. 5 to seat the base of cap well 14 onto cap well mounting fixture 28. Except for the presence of cap well 14, FIGS. 5 and 5A are identical to FIGS. 3 and 3A and therefore are not further described.

Cap well mounting fixture 28, as seen in FIGS. 3 and 3A, has a locking member 28a integrally formed therewith. Locking member 28a or a different structure serving the same purpose need not be formed integrally with cap well mounting fixture 28, but it is convenient, and preferred, to do so. In this embodiment, as seen in FIG. 3A-A, locking member 28a comprises an inwardly tapering crown 28a' which has a crenulated configuration formed by a series of cut-outs 28b extending around the periphery of a central opening 28a".

After cap well 14 is mounted on cap well mounting fixture 28 as shown in FIG. 5, detonator 16 is inserted, in the direction shown by the arrow I-1, into cap well 14 (FIG. 5B) within canister body 12 (FIG. 5) via cap access opening 14a, until crimp 16a of detonator 16 is engaged by inwardly tapering crown-like locking member 28a. This securely retains detonator 16 in place and restrains it against inadvertent dislodgement by a force as shown by arrow I-4 (FIG. 5B). FIG. 5C shows a detonator 16' which is of a size that it may be inserted more deeply into cap well 14 than detonator 16 of FIG. 5B. Detonator 16' is shorter than detonator 16 and has a crimp 16a', and is inserted into cap well 14 to a depth in which the end of bushing 16b' and fuse 18' engage locking member 28a to restrain detonator 16' against inadvertent dislodgement by a force as shown by arrow I-4 in FIG. 5B. The cut-outs 28b (FIG. 3A-A) enable the segments of locking member 28a between the cut-outs to more easily flex outwardly to provide for passage of detonator 16 through cap well mounting fixture 28 and then flex back to a snap-fit engagement with either crimp 16a of detonator 16 or the end of bushing 16b' and fuse 18' of detonator 16'.

Low density polyethylene has been found to be well suited as the plastic from which the canister assembly is made. In particular, low density polyethylene has been found to provide a suitable degree of stiffness and memory to the locking member 28a, that is, to provide the member with a flexural modulus lying in a suitable range, so that the locking member 28a flexes sufficiently to permit passage of detonator 16 therethrough, and then returns to, or returns sufficiently close to, its original position so as to retain detonator 16 in place. Low density polyethylene is suitable for the entire canister body 12 and cap well 14. Generally, any suitable material, such as other resins or blends of resins, which provide a suitable flexural modulus to the segments of locking member 28a and are otherwise suitable to the purpose, may of course be employed.

The purpose of locking member 28a, as noted elsewhere herein, is to prevent inadvertent removal or displacement of a detonator 16 or 16' from cap well 14 by tension imposed on fuse 18 or 18' when lowering the booster explosive 10 into a borehole or otherwise using the fuse to carry or suspend the booster explosive 10. On the other hand, it is sometimes necessary to intentionally remove the detonator 16 or 16' from cap well 14, for example, to replace a defective detonator. Therefore, locking member 28a, whether or not it is crenulated as illustrated herein, is not so stiff as to prevent removal of the detonator by a strong tug on fuse 18 or 18'. For example, locking member 28a may have a flexural modulus such that a sharp, strong tug on fuse 18 or 18' will impose a "live load", sufficient to pull the detonator back past the locking means to remove the detonator from the cap well 14. On the other hand, the locking member 28a easily retains the detonator in place within cap well 14 with a booster explosive, which typically weighs from about 3.2 to 32 ounces (90 to 900 grams), suspended from fuse 18 or 18', usually as a dead weight, with only a slight, if any, live load imposed on the fuse, for example, by lowering the booster explosive into a borehole.

FIGS. 4 through 4B show in more detail cap well 14 having a cap access opening 14a and an opposite closed end 14b. A cap well base 14c is formed at the cap access opening end 14a thereof. As best appreciated from the cross-sectional view of FIG. 4A, cap well 14 is hollow to provide an interior (unnumbered) configured to receive therein a suitable detonator. The enlarged partial cross-sectional view of FIG. 4B shows that cap well base 14c is of slightly larger diameter than the remainder of cap well 14 and has an interior surface 14d within which is formed a circumferential groove 14f and a shoulder 14g. Circumferential groove 14f provides base 14c with a modest amount of flexibility to assist in force-fitting of base 14c over the exterior surface 28c (FIG. 3A-A) of cap well mounting fixture 28 (FIGS. 3 through 3A-A).

Because cap well 14 is formed as a separate piece, canister body 12 including cap well mounting fixture 28, locking member 28a, fuse tunnel 22 and, when present, other structures may readily be formed by conventional injection molding techniques in a single, integral piece. This is a significant advantage of the present invention. The other structures may include radial reinforcing ribs, rails, and grooves, as described below in connection with FIGS. 7-7A. An attempt to mold such a structure with cap well 14 as an integral part thereof would be very difficult and require a molding arrangement much more complicated than molding canister body 12 and its constituent structures without cap well 14. Cap well 14, and the other embodiments of cap wells described herein, are readily formed by conventional injection molding techniques. The interior diameter and wall thickness may therefore be controlled to close tolerances. This is advantageous because the cap well interior may be designed to receive any standard or other size detonator with ample but not excessive room, thereby avoiding difficult and possibly dangerous instances of force-fit of the detonator into the cap well. Further, the molded wall of the cap well is designed to resist the pressure imposed when the canister body is filled with a flowing explosive which is to harden within the canister body about the cap well (and about the fuse tunnel). Some prior art expedients in which the thickness and stiffness of the cap well wall is not controllable to the extent attainable by molding a plastic resin such as low-density polyethylene, may suffer from the cap well being deformed by the pressure of the inflowing explosive. This would make insertion of the detonator difficult, possibly dangerous and in a severe case, impossible.

Referring to FIGS. 3, 4B and 5, shoulder 14g of cap well 14 engages locking member 28a when cap well 14 is mounted on mounting fixture 28 and fully inserted into canister body 12. Locking member 28 of cap well mounting fixture 28 represents only one structure suitable for retaining detonator 16 in place. Other structures could include, for example, a gripping member formed within cap well 14 to replace or supplement locking member 28a, the gripping member being designed to grip a crimp or some other portion of the detonator. However, the illustrated structure is preferred for its simplicity of design and ease of molding as part of a one-piece canister body. However attained, the positive retention of detonator 16 enables tension to be applied to fuse 18, as by using fuse 18 to lower booster explosive 10 into a borehole, and raise it if necessary to adjust its depth within, or temporarily remove it from, the borehole, without dislodging detonator 16 from its position within cap well 14.

FIG. 4C shows another embodiment of a cap well. Cap well 214 has a base 214c from which four fins 36 (only three of which are visible in FIG. 4C) protrude to provide an effective larger diameter of the portion of base 214c which contacts the top surface of platform 38 (FIGS. 3, 3A, 5 and 5A) within canister body 12. Fins 36 each have an opening 36a formed therein to reduce their resistance to flowing explosive introduced into the interior 12c of canister body 12 after cap well 14 has been mounted onto cap well mounting fixture 28. Fins 36 provide in this embodiment a stabilizing structure to help retain cap well 14 properly seated in place when a flowable explosive is introduced into the interior 12c of canister body 12. The stabilizing structure may not be needed in all, or even in any, cases because it has been found that the cap well 14 of FIGS. 4-4B may be mounted sufficiently securely to avoid any such tipping or toppling. In any case, cap well 214, like cap well 14, is simply inserted over cap well mounting fixture 28.

The exterior surface 28c (FIG. 3A-A) of cap well mounting fixture 28 is configured to snugly receive thereon the interior surface 14d (FIG. 4B) of cap well base 14c of cap well 14. Shoulder 14g contacts locking member 28a when cap well 14 is fully inserted onto mounting fixture 28. The length L (FIG. 4B) of cap well base 14c is great enough so that a tight fit, for example, a force fit, of the interior surface 14d of cap well base 14c over the exterior surface 28c of cap well mounting fixture 28 is sufficient to securely retain cap well 14 in place. Obviously, any other suitable mounting scheme may be employed including use of an adhesive, or provision of complementary screw threads on interior surface 14d of cap well base 14c and exterior surface 28c of cap well mounting fixture 28, or flexible ribs on the interior surface 14d of cap well base 14c, with or without corresponding grooves on the exterior surface 28c of cap well mounting fixture 28. However, a simple snap-on or force fit is preferred as it simplifies the design and molding of the cap well. For example, the circumferential groove 14f shown in FIG. 4B may be omitted and the interior surface 14b of cap well 14 as well as the exterior surface 28c of mounting fixture 28 may be smooth.

Figure 6:
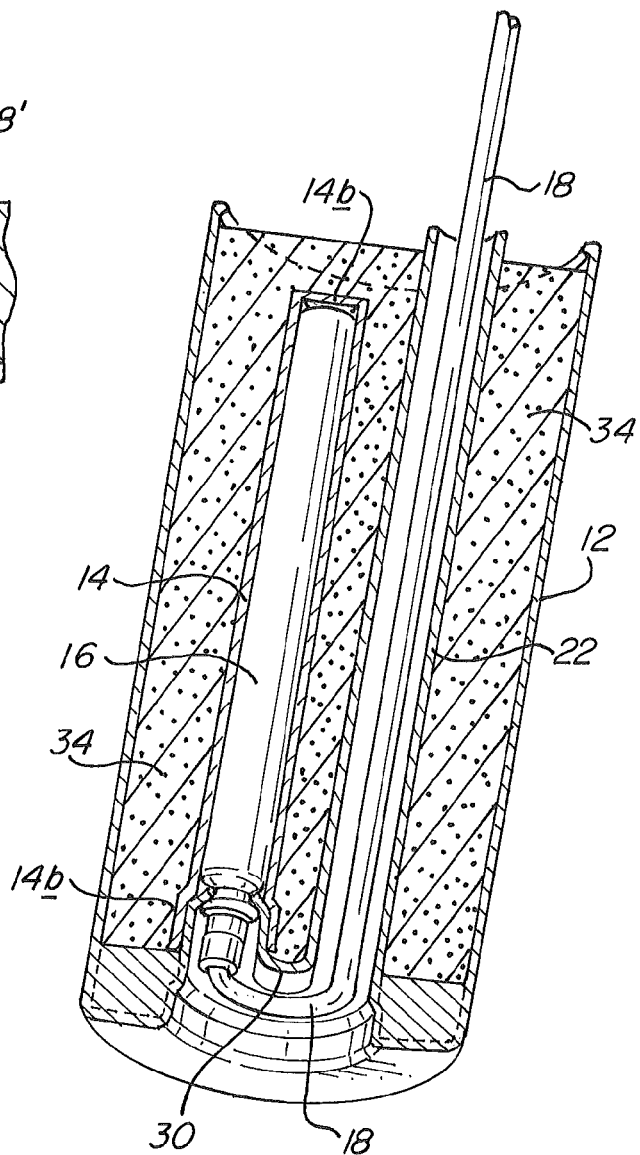
FIG. 6 is a perspective, longitudinal cross-sectional assembled view of the booster explosive of FIG. 1, with a detonator inserted therein and showing a hardened cast explosive contained within the interior of the canister assembly.

After cap well 14 is securely mounted in place within the interior 12c (FIG. 5) of canister body 12, a flowable explosive is introduced into the interior 12c from open, top end 12b of canister body 12, which normally will be filled by the explosive to the level shown by phantom line F in FIG. 3, substantially or nearly filling the entire interior 12c and surrounding both cap well 14, including closed end 14b thereof, and most if not all of fuse tunnel 22 as seen in FIG. 6, which shows the cured or hardened explosive 34. The canister assembly of the present invention provides a complete mold within which the flowable explosive is flowed and allowed or caused to harden. This obviates the need for use of a molding fixture to form the cap well and fuse tunnel in the explosive itself, as is a common prior art practice, and provides dimensionally stable cap walls and fuse tunnels fully lined with a molded plastic.

Generally, a preferred construction is for the base of the canister body to have therein a recess defining a platform which extends into the interior of the canister body, with the cap access opening and the fuse access opening extending from the interior of the canister body through the platform to the recess. The platform has therein a groove connecting the cap access opening and the fuse access opening and a section of the fuse is disposed within the groove when the detonator has been inserted into the explosive.

To use the booster explosive of FIG. 6, detonator 16 is placed into cap access opening 14*a* (see FIG. 1) thence into cap well 14 and is pushed forward to engage crimp 16*a* with the locking member 28*a* of cap well mounting fixture 28, as illustrated in FIG. 5B. This securely mounts detonator 16 encased within cap well 14 in the interior 12*c* of canister body 12. Fuse 18 of detonator 16 is then threaded through fuse access opening 22*a* to fuse tunnel 22 and pulled tight in the direction indicated by arrow I-3 in FIG. 1 to deploy a portion of fuse 18 into recessed groove 30, as best seen in FIG. 6. Recessed groove 30 is sized so that it may receive different types and different diameter size fuses including shock tube, pairs of electrical wires, flat conductors of the type used for certain electronic detonators, low-energy detonating cord, etc. Fuse tunnel 22 has an ample inside diameter capable of easily passing therethrough any suitable type of fuse, and even more than one fuse in cases where a cast booster explosive might include two or more detonators, plus a down line. The result is that the cast booster explosive comprises a detonator having a fuse extending therefrom, the detonator being disposed within the cap well and the fuse extending from the cap access opening thence through the fuse access opening to and through the fuse tunnel and exteriorly of the canister body.

Figure 7:
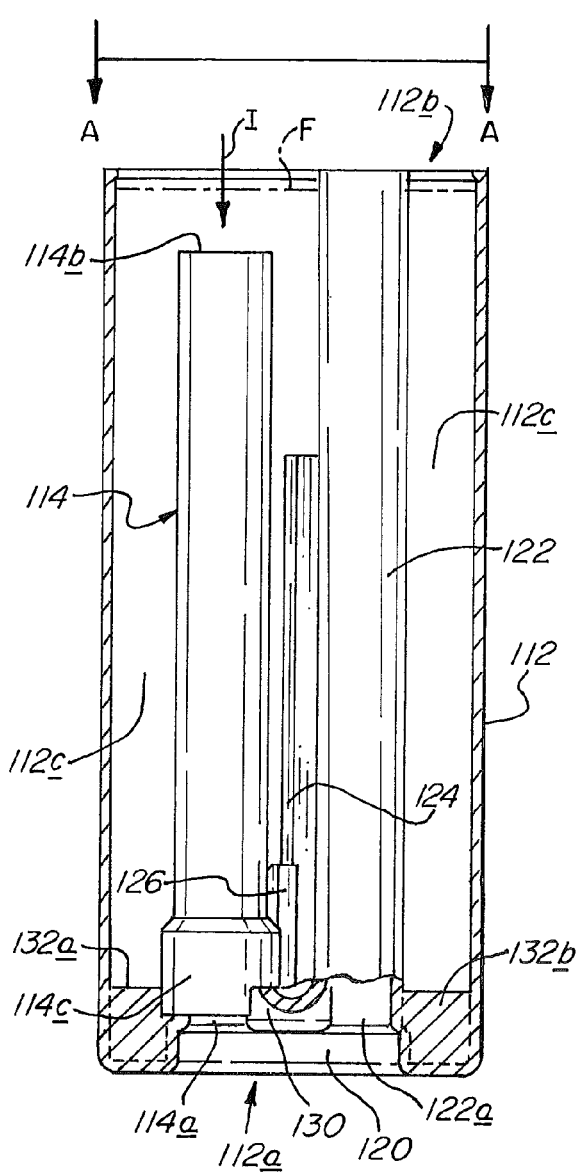
FIG. 7 is a view corresponding to that of FIG. 5, but showing a second embodiment of a canister assembly in accordance with the present invention.
Figure 7A:
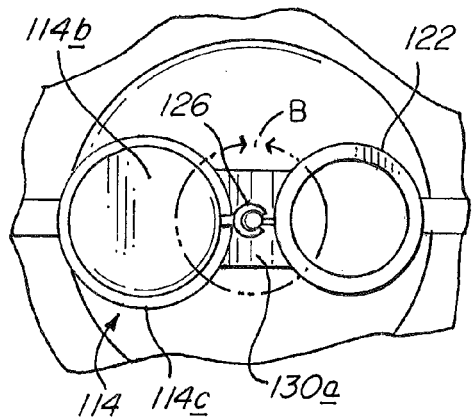
FIG. 7A is a partial plan view, enlarged relative to FIG. 7, taken along line A-A of FIG. 7.
Figure 7B:
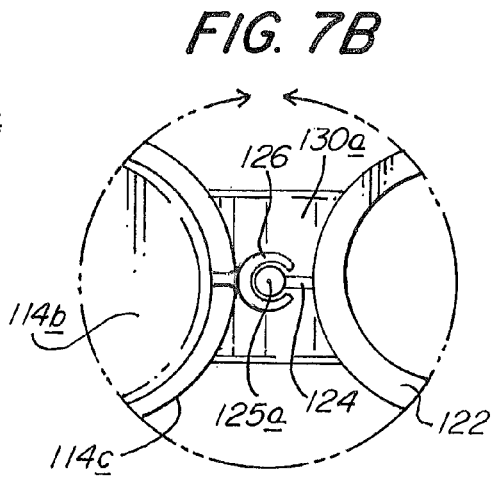
FIG. 7B is a view, enlarged relative to FIG. 7A, of approximately the portion of FIG. 7A enclosed within circle B thereof.
Figure 7C:
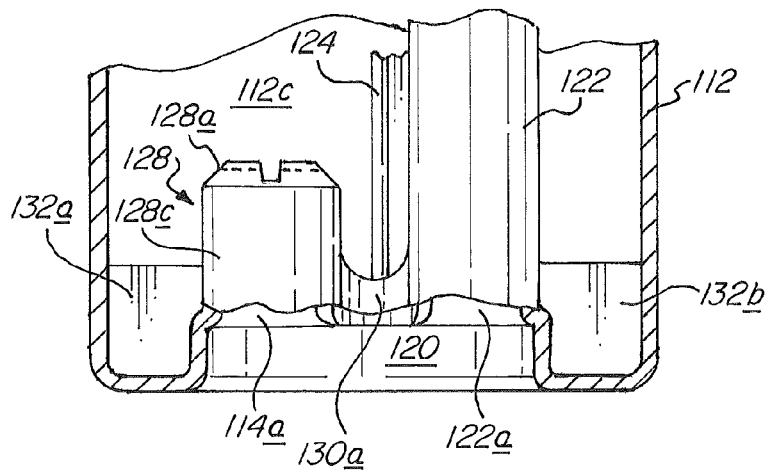
FIG. 7C is a cross-sectional view in elevation, enlarged relative to FIG. 7, of the bottom portion of the canister body of FIG. 7 with both the fuse tunnel and the cap well removed.
Figure 7D:
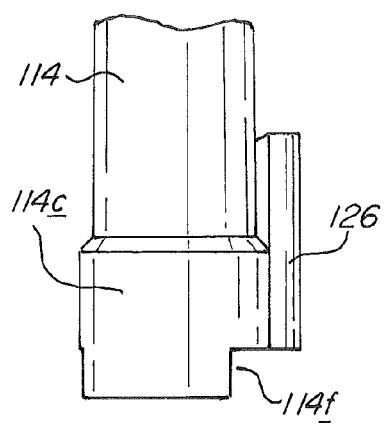
FIGS. 7D, 7E and 7F are partial elevation views, enlarged relative to FIG. 7, of different sides of the base (mounting) end of the cap well shown in FIG. 7.
Figure 7E:
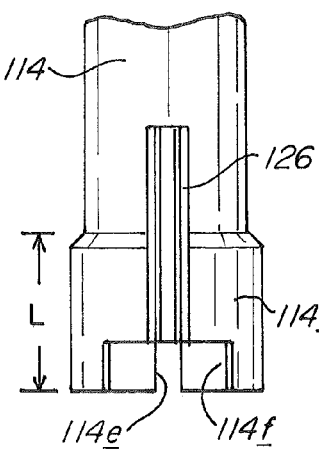
Figure 7F:
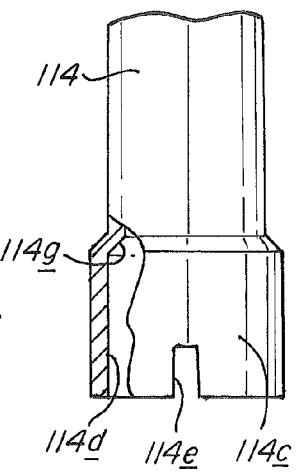

A canister assembly and parts thereof in accordance with a second embodiment of the invention are shown in FIGS. 7 through 7F inclusive. As will be appreciated from the following discussion, the canister assembly of FIGS. 7-7F may be similar or substantially identical to that of the embodiment of FIGS. 1-6, except for the provision of structure to lock cap well 114 to fuse tunnel 122. Canister body 112, like canister body 12 of the embodiment illustrated in FIGS. 1-6, is a one-piece unitary structure. A separately manufactured cap well 114 is configured to be mounted within canister body 112. As is seen in FIG. 7, canister body 112 has a bottom end 112*a*, an open, top end 112*b* and an interior 112*c*.

A recess 120 is formed in bottom end 112*a* of canister body 112 and within which are formed a cap access opening 114*a* leading to cap well 114 and a fuse access opening 122*a* leading to a fuse tunnel 122. Fuse tunnel 122 is disposed substantially parallel to cap well 114, as is conventional in the art. A recessed groove 130 (FIG. 7) extends between access openings 114*a* and 122*a* in a manner similar or identical to that of the embodiment of FIGS. 1-6.

FIG. 7 shows cap well 114 mounted within the interior 112*c* of canister body 112. In this embodiment, cap well 114 has a slide 126 (FIGS. 7, 7A, and 7B) which is crescent-shaped in cross section (FIG. 7B) and extends longitudinally along the cap well base 114*c* of cap well 114. Slide 126 projects radially outwardly from cap well 114, as best seen in FIG. 7B, and is essentially a circular tube with a longitudinally extending section removed along its entire length. As is the case with the embodiment of FIGS. 1-6, fuse tunnel 122 is preferably integrally molded as part of canister body 112 but it obviously could, like cap well 114, be a separate part from canister body 112 and be mounted within canister body 112 in a manner similar to that in which cap well 114 is mounted within canister body 112.

The partial plan view of FIG. 7A shows the closed end 114*b* of cap well 114 and further shows that fuse tunnel 122 is a tube open at both its ends in order to permit threading of a fuse therethrough. As best seen in FIGS. 7 and 7B, fuse tunnel 122 has a radially protruding rail 124 extending longitudinally along the bottom portion thereof, rail 124 having at its radially outward end a bulbous enlarged section 125*a* (FIG. 7B) which extends longitudinally along the entire length of rail 124. As best seen in FIGS. 7, 7A and 7B, the cap well base 114*c* of cap well 114 is of slightly larger diameter than the rest of cap well 114 to define a shoulder 114*g* (FIG. 7F). Cap well base 114*c* of cap well 114 is shown in FIG. 7E rotated 90 degrees clockwise from its position as shown in FIG. 7D, and is shown in FIG. 7F rotated 180 degrees from its position as shown in FIG. 7D.

As best seen in FIGS. 7 and 7B, rail 124 and slide 126 face and are aligned with each other when cap well 114 is mounted within canister body 112, in order that (FIG. 7B) the crescent-shaped slide 126 may engage bulbous enlarged section 125*a* of rail 124. It will be appreciated that as cap well 114 is inserted into the interior 112*c* of canister body 112 in the direction indicated by the arrow I in FIG. 7, slide 126 will engage bulbous portion 125*a* to thereby lock cap well 114 in sliding engagement with fuse tunnel 122.

A cap well mounting fixture 128 (FIG. 7C) is formed at the base of the interior 112*c* of canister body 112. Cap well mounting fixture 128 has an inwardly tapering crown defining a locking member 128*a* (FIG. 7C) which has a crenulated configuration similar or identical to that of cap well mounting fixture 28 of the embodiment of FIGS. 1-6. Shoulder 114*g* of cap well 114 (FIG. 7F) contacts the locking member 128*a* of cap well mounting fixture 128 when cap well 114 is fully inserted thereon.

The exterior surface 128*c* (FIG. 7C) of cap well mounting fixture 128 is configured to snugly receive thereon the interior surface 114*d* (FIG. 7F) of cap well base 114*c* of cap well 114. The length L (FIG. 7E) of cap well base 114*c* is great enough so that a tight fit of the interior surface 114*d* of cap well base 114*c* over the exterior surface 128*c* of cap well mounting fixture 128 (FIG. 7C) is sufficient to securely retain cap well 114 in place. However, in order to both guide the insertion of cap well 114 into place and to more securely retain it in place, cap well base 114*c* has a longitudinally extending rib slot 114*e* (FIG. 7F) configured to engage radial reinforcing rib 132*a* (FIG. 7C), and a saddle slot 114*f* (FIGS. 7D and 7E) configured to grippingly engage groove wall 130*a* (FIG. 7C).

Referring again to FIG. 7, cap well 114 is secured in place by being first inserted into the interior 112*c* of canister body 112 via open, top end 112*b* in the direction of arrow I in FIG. 7, and mounted therein on cap well mounting fixture 128 as described above. Slots 114*e* and 114*f* engage with, respectively, reinforcing ribs 132*a* and 132*b* and groove wall 130*a*, wherein shoulder 114*g* engages locking member 128*a*. Obviously, any other suitable mounting scheme may be employed.

The cap well 14 can be more readily inserted by hand into the interior of the canister body 12 than in the case of cap well 114 and canister 112, because cap well 114 requires aligning rib slot 114*e* and saddle slot 114*f* with structural features, such as reinforcing ribs 132*a*, 132*b* within canister body 12. To that extent, the structure of FIG. 5 is preferred over that of FIG. 7.

After cap well 114 is securely mounted in place within the interior 112*c* (FIG. 7) of canister body 112, a flowable explosive is introduced into the interior 112*c* from open, top end 112*b* of canister body 112, which normally will be filled by the explosive to the level shown by phantom line F in FIG. 7, substantially or nearly filling the entire interior 112*c* and surrounding both cap well 114, including closed end 114*b* thereof, and most of fuse tunnel 122. The open top of fuse tunnel 122 is not covered by the explosive in order to leave the top (at end 112*b*) of the fuse tunnel unobstructed. After curing or hardening, a solid cast explosive 34 fills canister body 112.

Figure 8:
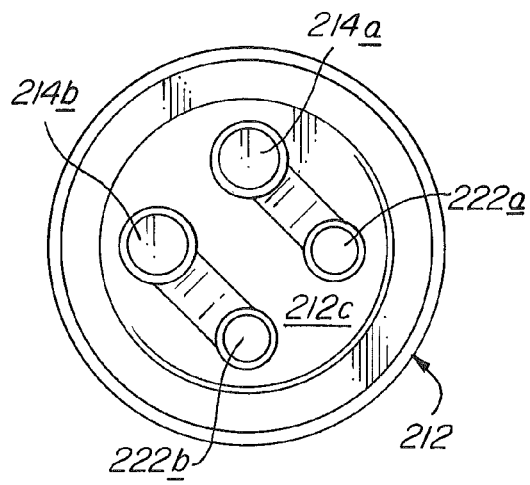
FIGS. 8 and 8A are, respectively, top and bottom views of a third embodiment of a canister body in accordance with the present invention.
Figure 8A:
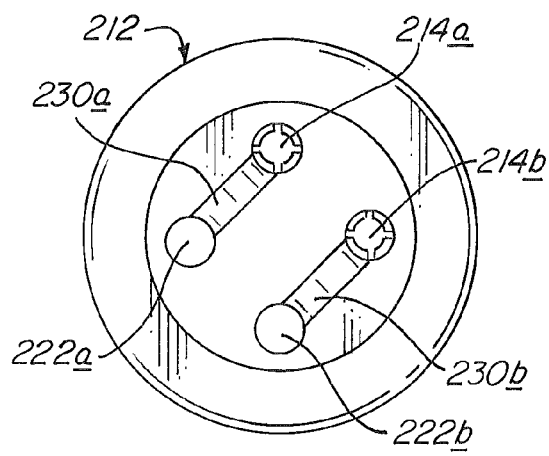

FIGS. 8 and 8A show an embodiment in which a canister body 212 defines an interior 212*c* (FIG. 8) in which two cap wells 214*a* and 214*b* are provided. Recessed groove 230*a* (FIG. 8A) connects the access openings (unnumbered in FIG. 8A) to cap well 214*a* and fuse tunnel 222*a*. Similarly, recessed groove 230*b* connects the unnumbered access openings to cap well 214*b* and fuse tunnel 222*b*. The fuses (not shown) of the two detonators (not shown) will lie in, respectively, recessed grooves 230*a* and 230*b* in a manner analogous to that illustrated in FIG. 6. This embodiment provides for the insertion of two detonators (not shown in FIG. 8 or 8A) in canister body 212 for the sake of providing redundancy to reduce the possibility of failure, and/or a more powerful explosive output to ensure initiation of the solid cast explosive (not shown in FIG. 8 or 8A) in the interior 212*c* (FIG. 8) of canister body 212.

Figure 9:
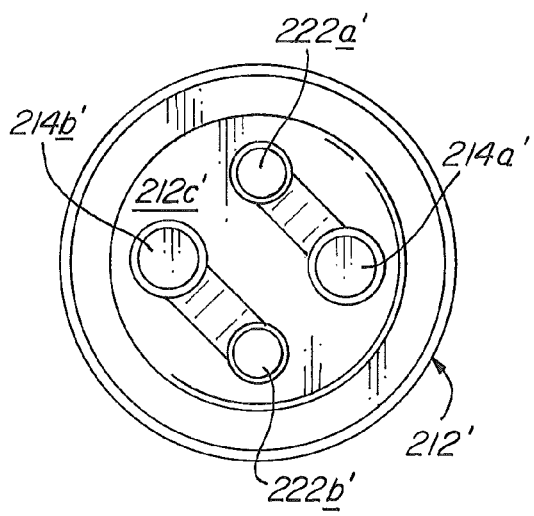
FIGS. 9 and 9A are, respectively, top and bottom views of a fourth embodiment of a canister body in accordance with the present invention.
Figure 9A:
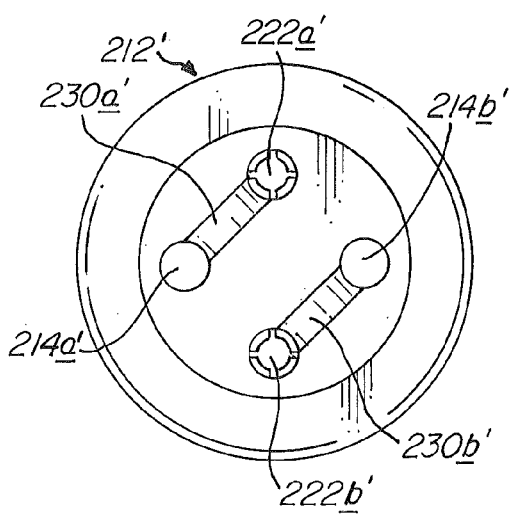

The components of FIGS. 9 and 9A are numbered identically to those of FIGS. 8 and 8A except for the addition of a prime indicator. Canister body 212' is substantially identical to canister body 212 except that cap wells 214*a*' and 214*b*' are arranged diametrically opposite each other, as are fuse tunnels 222*a*' and 222*b*'. In the embodiment of FIGS. 8 and 8A, cap wells 214*a* and 214*b*, like fuse tunnels 222*a* and 222*b*, are disposed adjacent each other in the circular formation. Inasmuch as that is the only difference between the two embodiments, it is not necessary to further describe the structure of FIGS. 9 and 9A.

Although it is unlikely that more than two detonators would ever be required or desired within a single booster explosive, the present invention includes within its purview the provision of cap wells and fuse tunnels for more than two detonators, for example, three or more detonators. In some embodiments, there may not be an equal number of cap wells and fuse tunnels in a given canister body. For example, there may be more cap wells than fuse tunnels as a single fuse tunnel may contain more than one fuse. Alternatively, a single fuse may be connected to branch lines in the recessed grooves to serve more than one detonator, although a separate fuse for each detonator is preferred for redundancy. Recessed grooves analogous to recessed grooves 230*a* and 230*b* shown in FIG. 8A may be designed to accommodate any such variations.

While the invention has been described in detail with reference to specific embodiments, it will be appreciated that numerous variations may be made to the described embodiments, which variations nonetheless lie within the scope of the present invention.

What is claimed is:

1. Components for a canister assembly for a cast booster explosive, the components comprising a canister body defining an interior of the body and, separate from the canister body, a cap well:
   (a) the canister body having (i) a wall defining an interior of the canister body, (ii) a canister base closing one end of the canister body, (iii) a fuse tunnel open at both ends thereof and extending along the length of the canister body, (iv) a cap well mounting fixture open to passage of a detonator therethrough, and (v) a locking member disposed at the mounting fixture and configured to retain a detonator within the cap well; and
   (b) the cap well being closed at one end and open at its opposite connector end, and being configured to have its connector end seated on the cap well mounting fixture, and to receive and enclose such detonator within the cap well to isolate such detonator from the interior of the canister body.

2. Components for a canister assembly for a cast booster explosive, the components comprising a canister body and, separate from the canister body, a cap well:
   (a) the canister body having (i) a wall defining an interior of the canister body, (ii) a canister base closing one end of the canister body, (iii) a fuse tunnel open at both ends thereof and extending along the length of the canister body, (iv) a cap well mounting fixture open to passage of a detonator therethrough, and (v) a locking member disposed at the mounting fixture and configured to retain a detonator within the cap well; and
   (b) the cap well being closed at one end and open at its opposite connector end and configured to have its connector end seated on the cap well mounting fixture, and to receive such detonator within the cap well; and wherein the canister body has a canister base, the cap well connector end has an interior surface, the cap well mounting fixture comprises a cylindrical member which cooperates with the locking member to define an interior passageway which opens to a cap well access opening in the canister base, the mounting fixture has an exterior surface which is configured to be snugly engaged by the interior surface of the cap well base whereby to securely mount the cap well on the mounting fixture, and the locking member is carried on the mounting fixture and extends into the interior passageway.

3. The components of claim 2 wherein the mounting fixture and the locking member comprise an integral, one-piece member with the locking member comprising an inwardly tapering crown which partially occludes the interior passageway.

4. The components of claim 2 wherein the fuse tunnel is open to a fuse access opening in the base and the exterior surface of the mounting fixture are each of circular cross-sectional configuration.

5. A canister assembly for a cast booster explosive comprising the components of any one of claim 1, 2, 3 or 4 wherein the cap well is mounted on the mounting fixture.

6. A cast booster explosive comprising the canister assembly of claim 5 having a cast explosive contained within the interior of the canister body.

7. A canister assembly for a cast booster explosive, the canister assembly comprising:
   (a) a cylindrical canister body having (i) a wall defining an interior of the canister body, (ii) an open top end, (iii) an opposite bottom end closed by a canister base, (iv) a fuse tunnel open at both ends thereof and extending within the interior of the canister body from a fuse access opening in the base, (v) a cap well mounting fixture open to a cap access opening in the base, and (vi) a locking member disposed at the cap access opening and configured to engage a detonator to retain such detonator within the canister body, all the features of (i) through (vi) above being embodied in a molded single plastic piece; and
   (b) a cap well closed at one end and open at its opposite connector end and configured to receive such detonator therein, the connector end of the cap well being configured to be seated on the cap well mounting fixture to mount the cap well within the interior of the canister body.

8. The canister assembly of claim 7 wherein the locking member is integrally formed on the cap well mounting fixture.

9. The canister assembly of claim 7 wherein both the canister body and the cap well are injection-molded plastic structures.

10. The canister assembly of claim 7 wherein the base of the canister body has therein a recess defining a platform which extends into the interior of the canister body, and the cap access opening and the fuse access opening extend from the interior of the canister body through the platform to the recess.

11. The canister assembly of claim 10 wherein the platform has therein a groove connecting the cap access opening and the fuse access opening, the groove being configured to receive therein a detonator fuse extending between the cap access opening via the groove to the fuse access opening.

12. The canister assembly of claim 7 wherein the cap well is mounted on the cap well mounting fixture with the cap well disposed within the interior of the canister body.

13. A cast booster explosive comprising the canister assembly of claim 12 and further including a cast explosive within the interior of the canister body, the cast explosive being configured to leave unobstructed the fuse tunnel, the fuse access opening, the cap access opening, and the mounting fixture.

14. The cast booster explosive of claim 13 further comprising a detonator having a fuse extending therefrom, the detonator being disposed within the cap well and retained therein by the locking member.

15. The cast booster explosive of claim 14 wherein the base of the canister body has therein a recess defining a platform which extends into the interior of the canister body, and the cap access opening and the fuse access opening extend from the interior of the canister body through the platform to the recess, the platform having therein a groove connecting the cap access opening and the fuse access opening, and wherein a section of the fuse between the cap access opening and the fuse access opening is disposed within the groove.

16. A method for making a canister assembly for a cast booster explosive comprising the steps of:
(a) molding a first synthetic polymeric material to form a one-piece cylindrical canister body having the following features (i) through (vi) inclusive: (i) a wall defining an interior of the canister body, (ii) an open top end, (iii) an opposite bottom end closed by a canister base, (iv) a fuse tunnel open at both ends thereof and extending within the interior of the canister body from a fuse access opening in the base, (v) a cap well mounting fixture open to a cap access opening in the base, and (vi) a locking member configured to engage a detonator to retain it within the canister body;
(b) molding a second synthetic polymeric material to form a cap well closed at one end and open at its opposite connector end, the connector end being configured to be seated on the mounting fixture of the canister body; and
(c) after step (b), mounting the cap well within the interior of the canister body onto the cap well mounting fixture to form the canister assembly.

17. The method of claim 16 wherein the first and second synthetic polymeric materials are substantially identical to each other.

18. The method of claim 16 further comprising incorporating the canister assembly into a cast booster explosive by the additional steps of:
introducing a flowable explosive into the interior of the canister body; and
causing or allowing the flowable explosive to harden.

19. The method of claim 18 further comprising introducing a detonator into the cap well, the detonator having an explosive tip at one end and a fuse extending from its opposite end and out of the cap access opening into the fuse tunnel, and the detonator being retained within the cap well by the locking member.

* * * * *